Feb. 1, 1955
J. W. HADEN
2,700,972
METHOD AND APPARATUS FOR HOLDING, TRANSPORTING, AND
BREAKING SUTURE TUBES
Filed Nov. 19, 1949
6 Sheets-Sheet 1
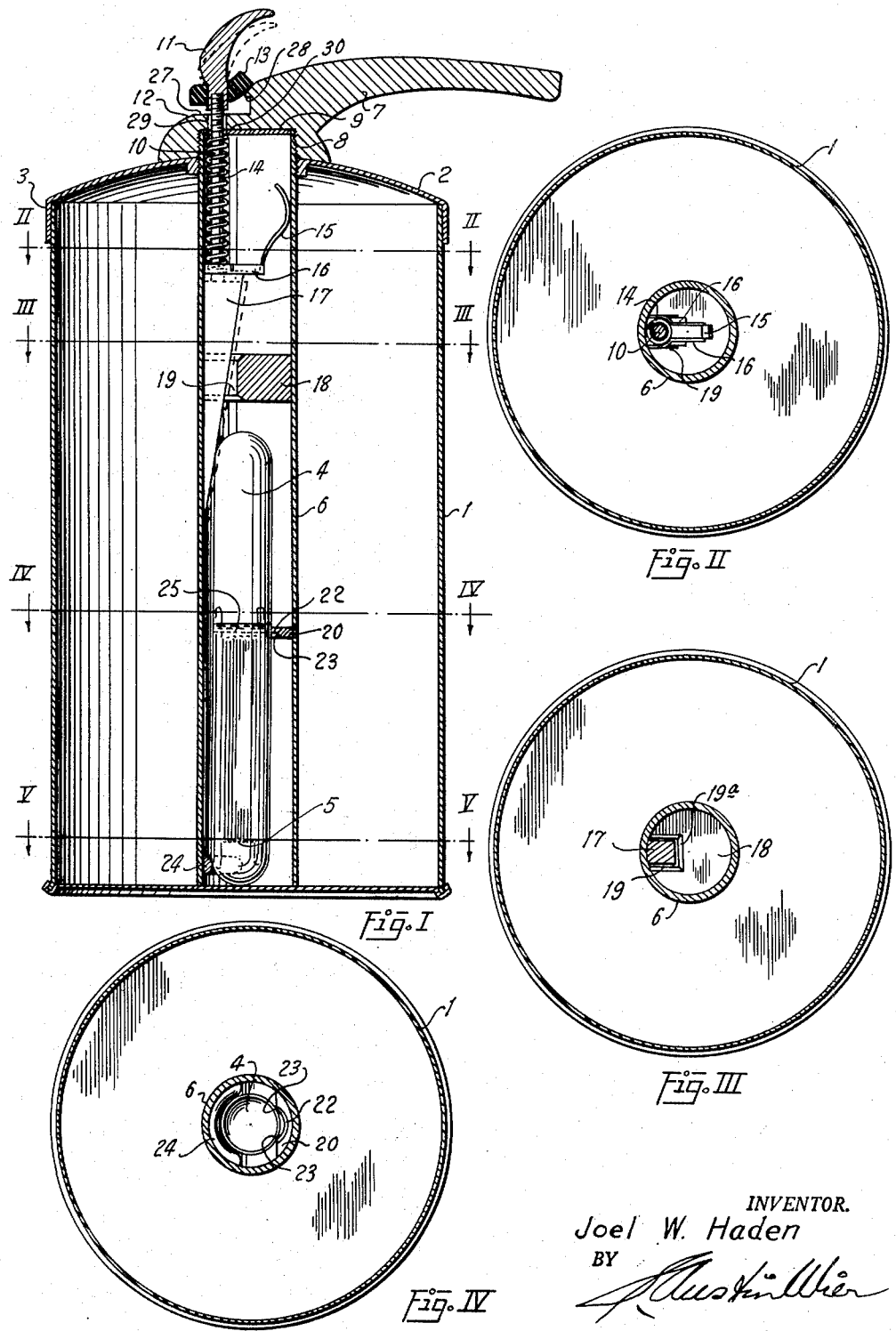
INVENTOR.
Joel W. Haden
BY
ATTORNEY Feb. 1, 1955 J. W. HADEN 2,700,972
METHOD AND APPARATUS FOR HOLDING, TRANSPORTING, AND
BREAKING SUTURE TUBES
Filed Nov. 19, 1949 6 Sheets-Sheet 2
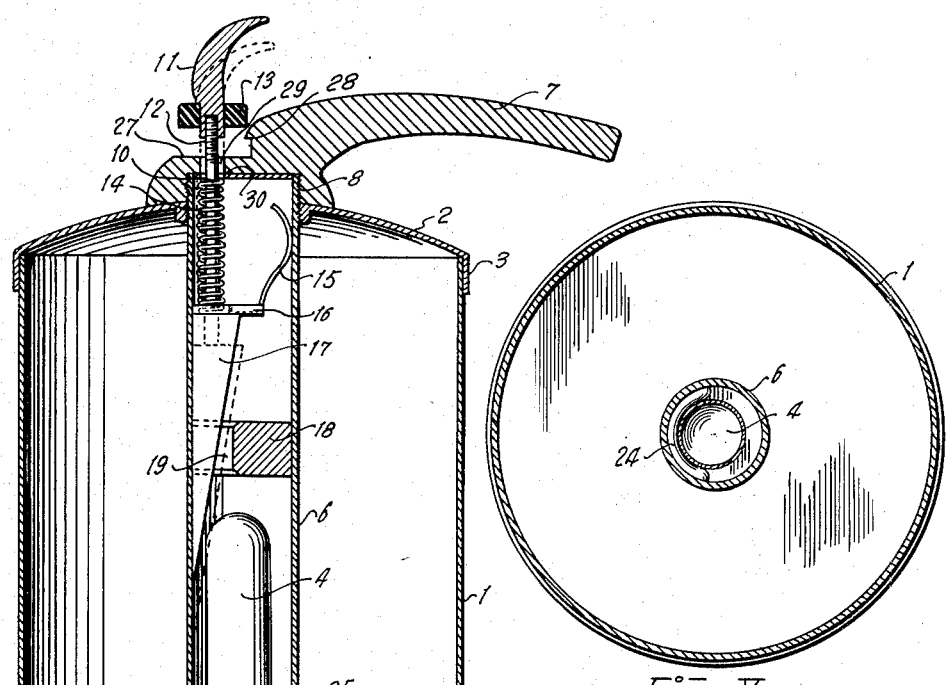
Fig. V
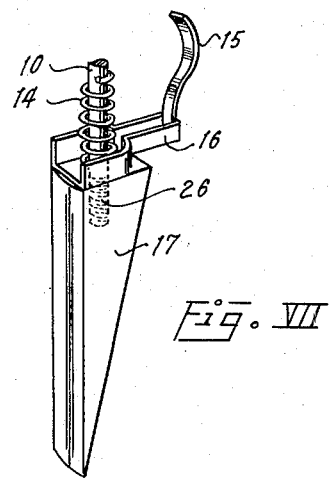
Fig. VII
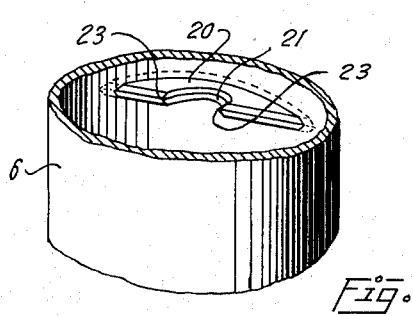
Fig. VI
Fig. VIII
INVENTOR.
Joel W. Haden
BY
ATTORNEY Feb. 1, 1955
J. W. HADEN
2,700,972
METHOD AND APPARATUS FOR HOLDING, TRANSPORTING, AND BREAKING SUTURE TUBES
Filed Nov. 19, 1949
6 Sheets-Sheet 3
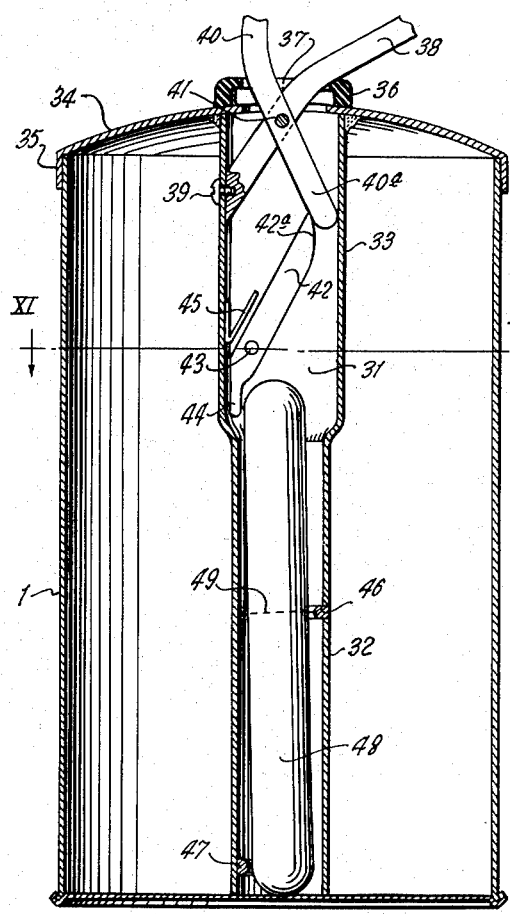
Fig. IX
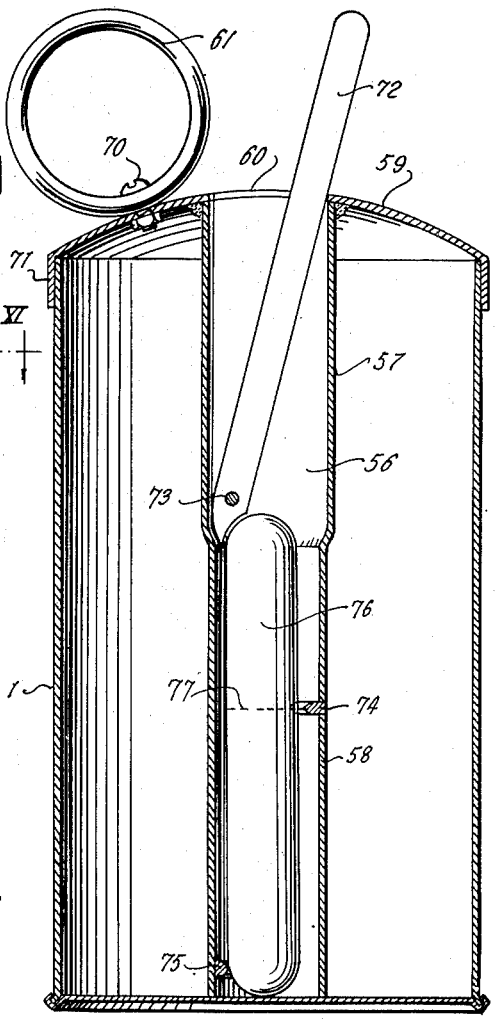
Fig. X
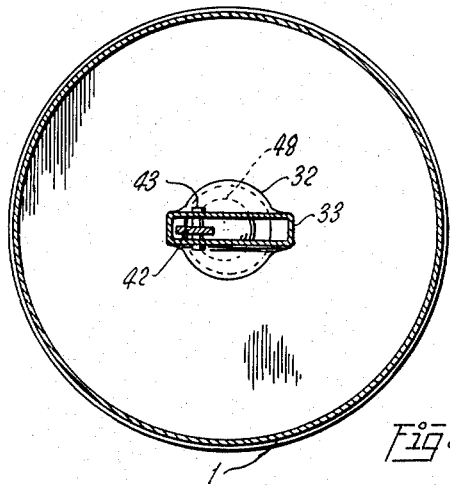
Fig. XI
INVENTOR.
Joel W. Haden
BY
ATTORNEY

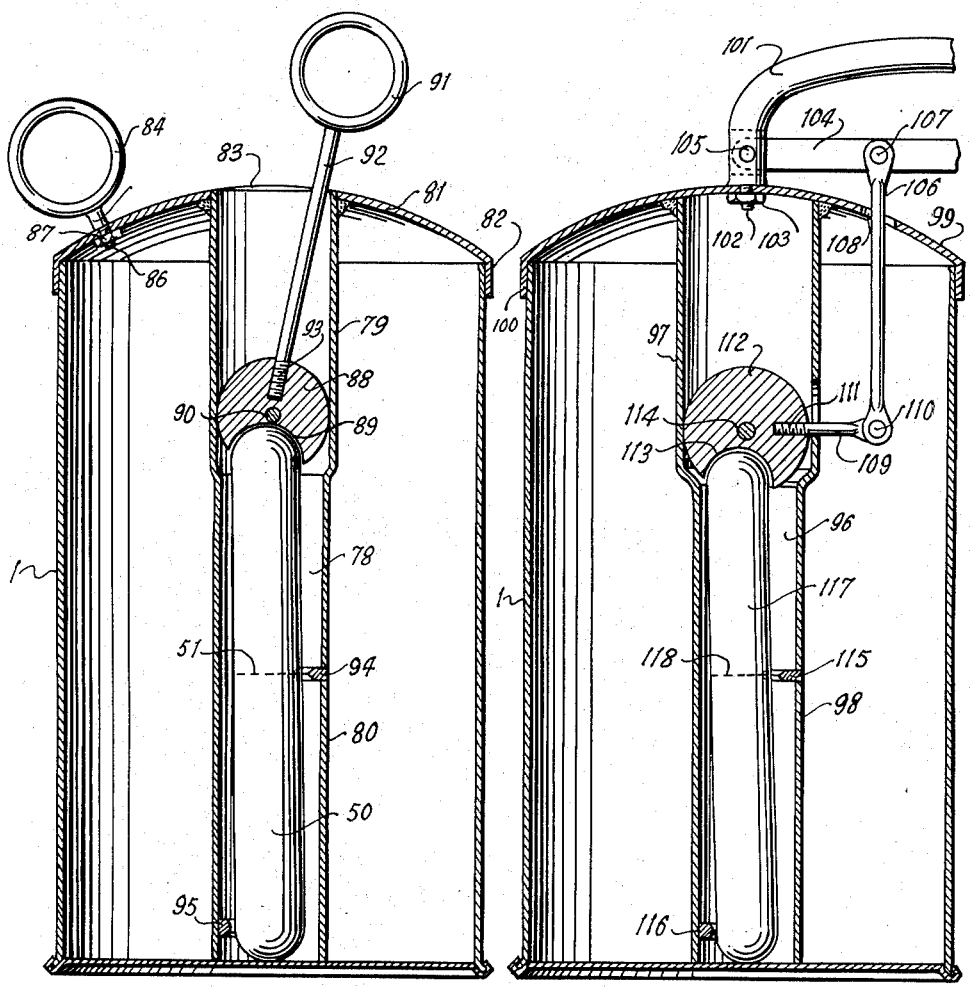
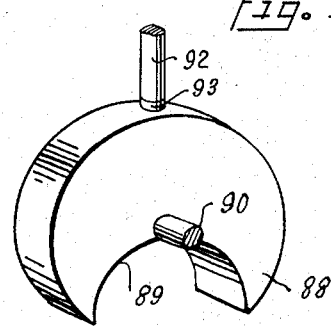
INVENTOR.
Joel W. Haden
BY
ATTORNEY

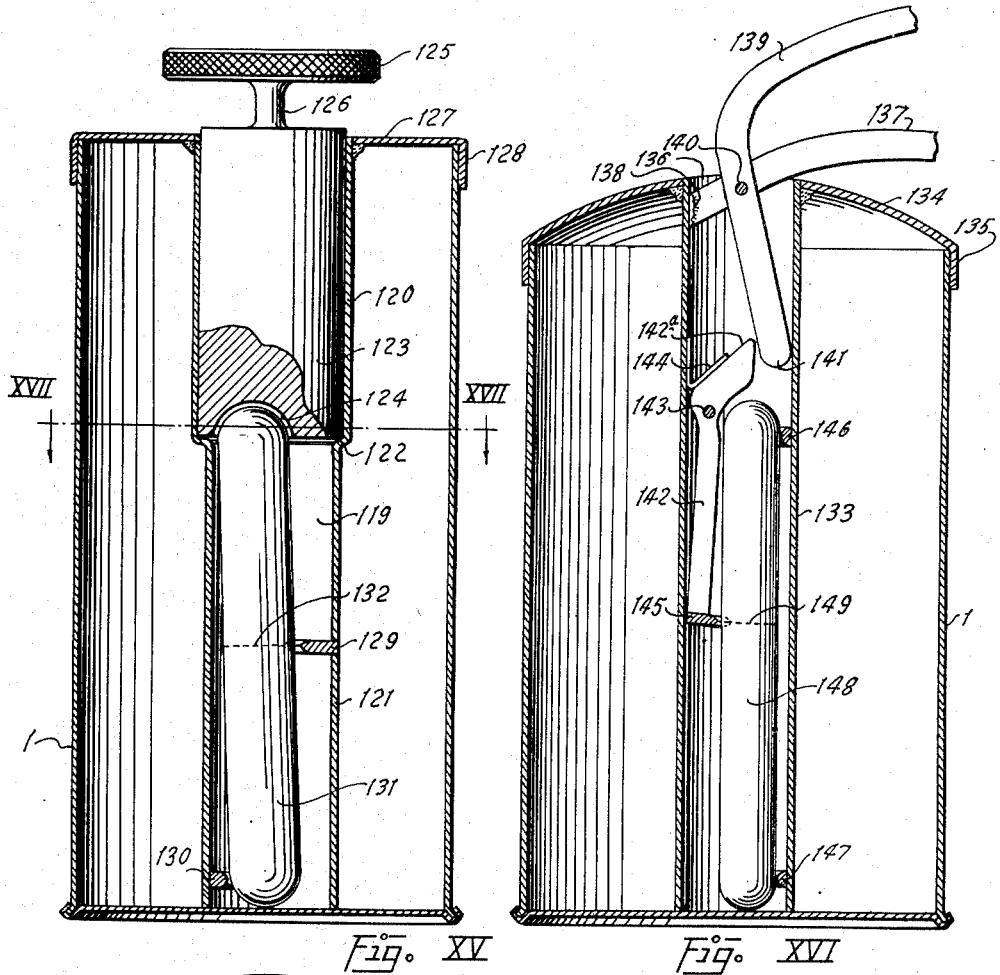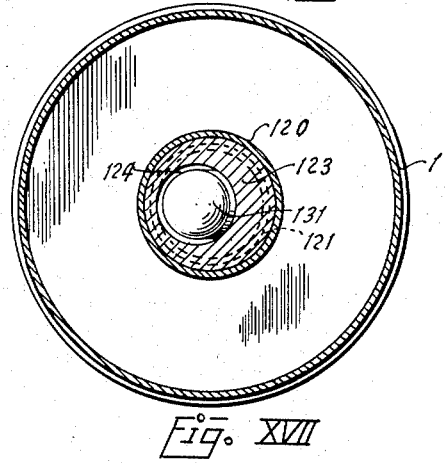

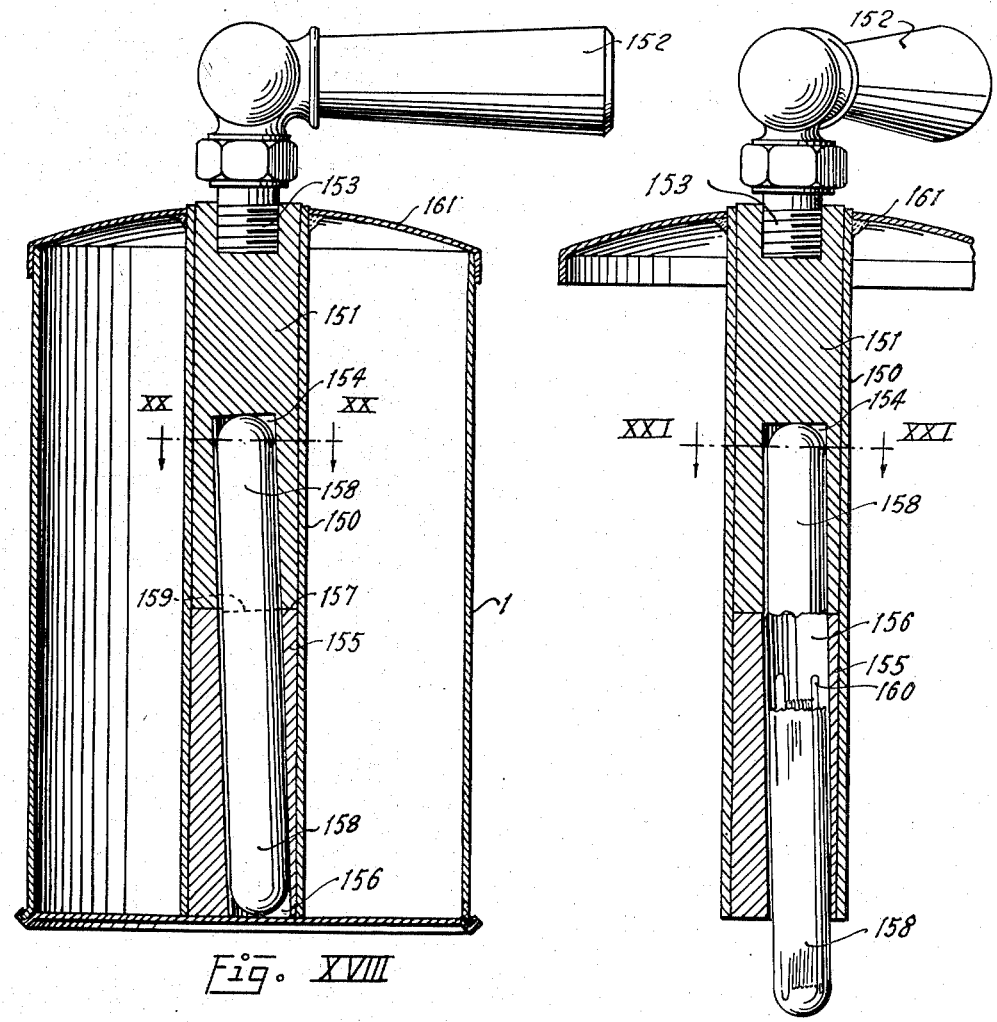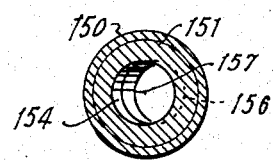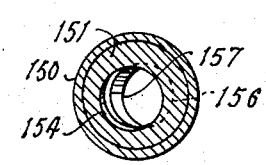

United States Patent Office 2,700,972
Patented Feb. 1, 1955

2,700,972

METHOD AND APPARATUS FOR HOLDING, TRANSPORTING, AND BREAKING SUTURE TUBES

Joel W. Haden, Dallas, Tex.

Application November 19, 1949, Serial No. 128,418

22 Claims. (Cl. 128—272)

This invention relates to method and apparatus for picking up, transferring and breaking glass suture tubes, and particularly relates to a suture tube breaker which is mechanically operated and provides for the picking up, transporting and breaking of suture tubes without manually handling them.

Surgical sutures are customarily sealed in a glass tube or capsule filled with a germicidal solution. The tubes are shipped in suitable containers, and after reaching the hospital or other place where they are to be used, they are usually placed in a jar filled with germicidal solution where they are kept until withdrawn for use. In some instances the tubes are shipped in a sealed container, filled with germicidal solution and can be used directly from the container.

Such suture tubes are usually individually removed from the jar or container by an attendant with forceps, and they are individually wrapped in a sterile towel or gauze pad and broken by hand by a sterile nurse to remove the suture for use in an operation.

To facilitate the breaking of a suture tube, the manufacturer usually places a score mark or breaking mark around the periphery of the tube at or about the midpoint of the length thereof, to thus weaken it and allow for ease in breaking.

The practice of breaking suture tubes by hand has been found unsatisfactory, inadequate, difficult and accompanied by certain hazards, as enumerated below:

(1) Due to the fact that suture tubes are broken by manual pressures while enclosed in an opaque towel or gauze pad, the location of the score mark, or desirable breaking point, can only be approximately determined by the suture nurse.

(2) The resultant imperfect fracture of the suture tube at times leaves sharp, jaggered glass fragments mingled with the delicate suture material thereby exposed.

(3) These glass fragments sometimes pierce the gloved hand of the suture nurse, thus rendering her non-sterile and thus contaminating the sterile suture material.

(4) The glass fragments above mentioned are occasionally compressed against the exposed suture material, thereby cutting, scraping and weakening it, presenting the hazard that the surgeon may employ a weakened strand of suture material within the tissues which may break either at or after operation because the damage done to the suture material by the fragments of glass above mentioned.

(5) The danger of a partial evisceration of tissue along the suture line is well recognized, and any suture material which has been weakened by cutting or scraping of glass fragments prior to its use offers a definite hazard to proper wound healing, with resulting danger and impeded recovery of the patient.

Heretofore no known surgical instrument has been devised or used which will pick up, transport and break a suture tube in one continuous operation by one person.

My invention is intended to overcome the above recited deficiencies in prior practice and to provide a mechanical instrument which will perform the function of picking up, transporting and breaking the suture tube, maintaining it in its sterile condition during such procedure, and providing for an even and smooth break of the suture tube without the resultant shattering encountered when the suture tube is broken by hand. Thus the suture is assured of being sterile when used; fewer sutures need be discarded by reason of contamination and breaking; and the danger of weakening the sutures by laceration is eliminated.

My invention basically consists of a tube or sheath of sufficient length to reach to the bottom of a suture tube jar, can or other container, so that its operating handles will protrude from the top of the container. Arranged inside of said sheath is a mechanism designed to apply sufficient lateral thrust to the ends of a suture tube inserted therein to bend and break the tube.

The suture tube is so placed automatically in the sheath that the score mark on the suture tube approximately coincides with a center breaker or cutter within the sheath against which the glass suture tube is bent to breaking point.

By fulcrum, cam, or leverage arrangement, lateral thrust is exerted against the ends of the tube and it is broken at the breaker at or near the score mark on the tube.

After the tube is broken the lower half thereof, containing the suture, falls out of the sheath, thus exposing the suture material and making it available for immediate use.

In actual practice it is anticipated that the sheath shall be made an integral or attached part of a lid which will fit a suture jar, container or can, so that the suture tube transporter and breaker may remain in the jar, container or can at all times, immersed in the germicidal solution therein, so that the instrument will remain sterile at all times and ready for instant use. By such practice the use of a separate jar, vial or bottle in which the transfer forceps are kept is eliminated. However, my device may be made without the lid attached thereto. It is not dependent on the lid for its operation.

Among the purposes to be attained by this invention, in addition to the foregoing, are the following:

1. To provide a suture tube holder, transporter and breaker which is at all times, when not in use, immersed in, and encompassed by, the same germicidal and sterilizing solution which provides sterility and freedom from contamination for the glass suture tubes stored within a container, jar or can.

2. To provide such a suture tube holder, transporter and breaker having a lid thereon adapted to fit a storage jar or other container for suture tubes, so as to protect the sterility of the suture tube breaker and transporter, as well as the suture tubes themselves.

3. To provide a suture tube holder, transporter and breaker which allows for the carrying of the suture tube within a sheath from its container to a place where it is to be broken, carrying thereon a moist film of germicidal or sterilizing liquid in which the suture tubes are immersed and which remains on the suture tubes, as well as on and within the suture tube breaker, thus protecting the suture tube from exposure to air-borne contamination or bacteria while it is thus being transported.

4. To provide a suture tube holder, transporter and breaker, which can be used by the non-sterile nurse to accomplish the entire cycle of picking up, transporting and breaking glass suture tubes, thus freeing the sterile, suture or instrument nurse for more pressing and important duties in the preparation of her instruments and attending the surgeon during the operation.

5. To provide a suture tube holder, transporter and breaker which will allow the suture tube to be picked up by very light pressure on the handle of the apparatus, and to be broken by a slightly greater pressure on the handle, with the result that a clean break or fracture of the glass tube at or about the score mark thereon is attained using only one hand in the entire cycle of operation.

6. To provide a suture tube holder, transporter and breaker which may be easily operated by one hand under rigidly sterile procedure, thus minimizing the possibility of contamination of the exterior of the glass tube being thus transported and broken by the suture tube breaker.

7. To provide a suture tube holder, transporter and breaker which will allow for the picking up, transporting and breaking of the suture tube without the necessity of touching it with human hands.

8. To provide a suture tube holder, transporter and breaker which fractures the glass suture tube smoothly and evenly at or about the score mark thereon, with a minimum of resultant shreds or particles of fractured glass to damage, fray, cut or scar the delicate suture material within the tube, and eliminates the use of a sterile towel or sterile gauze pads in the breaking of the suture tubes.

9. To provide a suture tube holder, transporter and breaker which eliminates the use of sterile towels, sponges and gauzes in the breaking of suture tubes, thus resulting in a saving to the hospital or surgeon, and which also prevents the contamination and unnecessary breaking of sutures, thus resulting in further savings.

10. To provide method and apparatus for picking up, holding, transporting and breaking a suture tube within a tube or sheath, whereby during the entire operation the suture tube's exposure to the outside atmosphere, with the consequent danger of contamination, is reduced to a minimum.

11. To provide method and apparatus for picking up, holding, transporting and breaking a suture tube wherein the suture tube is picked up, transported and broken within a tube or sheath by pressure exerted from outside of the sheath by means of leverage.

12. To provide method and apparatus for breaking a suture tube within an enclosure, capsule or sheath by bending the tube therein until the breaking point is reached.

Other and further objects of my invention will become apparent upon the reading of the detailed specification hereinafter following, and by referring to the attached drawings.

Preferred embodiments of my invention are shown in the attached drawings in which:

Figure I is a cross-sectional elevational view of a preferred form of my suture tube holder, transporter and breaker instrument, in operative position on a conventional suture tube can;

Figure II is a cross-sectional view taken along the lines II—II of Figure I;

Figure III is a cross-sectional view taken along the line III—III of Figure I.

Figure IV is a cross-sectional view taken along the line IV—IV of Figure I;

Figure V is a cross-sectional view taken along the line V—V of Figure I;

Figure VI is a cross-sectional elevational view of a preferred form of my suture tube holder, transporter and breaker, showing wedge in raised position;

Figure VII is a perspective view of wedge used in my suture tube holder, transporter and breaker, said wedge having a coil spring and leaf spring attached thereto;

Figure VIII is a fragmentary perspective view of the sheath of the suture tube holder, transporter and breaker, showing the center breaker on the interior thereof;

Figure IX is a cross-sectional elevational view of a modified form of my invention showing it attached to a conventional suture tube can, said form employing a lever and cam arrangement.

Figure X is a cross-sectional elevational view of another modified form of my invention attached to a conventional suture tube can, said form employing a single lever arrangement;

Figure XI is a cross-sectional view taken on the line XI—XI of Figure IX;

Figure XII shows a cross-sectional elevational view of another modified form of my invention attached to a standard suture tube can, which form employs a rotating disc for applying leverage to the suture tube;

Figure XIII shows another modified form of my invention attached to a standard suture tube can in which a rotating disc is employed for applying the leverage, but a different arrangement is employed for rotating the disc;

Figure XIV is an enlarged perspective view of the rotatable disc employed in the device shown in Figures XII and XIII;

Figure XV shows a cross-sectional elevational view of another modified form of my invention in which a rotatable bushing is employed for applying leverage to the suture tube;

Figure XVI shows a cross-sectional elevational view of another modified form of my invention in which the leverage is applied at the mid point of the suture tube;

Figure XVII shows a cross-sectional view taken on the line XVII—XVII of Figure XV;

Figure XVIII shows a cross-sectional elevational view of another modified form of my invention employing a rotatable bushing for applying leverage to the suture tube;

Figure XIX shows a cross-sectional elevational view of the form of my invention shown in Figure XVIII wherein the position of the rotatable bushing is shown after the suture tube has been broken;

Figure XX is a cross-sectional view taken along the line XX—XX of Figure XVIII; and Figure XXI is a cross-sectional view taken along the line XXI—XXI of Figure XIX.

Numeral references are used to designate the parts shown in the various figures in the drawings, and like numerals are employed to designate like parts throughout the drawings.

The numeral 1 indicates a container or can for suture tubes. Each such can usually contains 36 suture tubes, or more; and after the suture tubes are packed in the can, suspended in the sterilizing solution, the can is hermetically sealed by a lid, and such lid is usually attached by means of a tear-strip which may be removed with a key. The suture tubes are made in different sizes and, therefore, the cans in which they are packed and shipped vary in size. The above is an accepted manner of packing and shipping suture tubes, although most manufacturers pack some suture tubes in cardboard boxes for shipment.

By using the can as described above, the suture tubes are suspended in a sterilizing solution, and it is not necessary for the hospital to sterilize the tubes after they arrive at the hospital. It is only necessary for them to remove the top of the can, thus rendering the suture tubes contained therein available for immediate use. No preliminary cleansing and sterilizing is necessary as is required when the tubes are packed in boxes.

The lid 2 has a flange 3 which extends downward over the upper edge of the can 1 so that dust and contaminating bacteria from the outside air may not enter the can. The lid 2, with the breaker attached, may remain on the can at all times except when removed to transport and break a suture tube.

For purpose of illustration only one suture tube, ampoule or capsule 4 is shown. However, a multiplicity of tubes may be in the container or can. This suture tube is made of glass and has suspended therein in a sterilizing solution, a suture 5 which is wound about a reel. As shown, the suture tube 4 is inserted in the sheath or tubular member 6. As shown, the sheath 6 is a cylindrical or tubular member, preferably made of metal or other suitable durable material, which is of sufficient length to extend to the bottom of the can 1, or other container for suture tubes, when the lid 2 is placed upon the can; and the sheath may be of varying diameters, and lengths to accommodate different diameters and lengths of suture tubes. The lower end of the sheath is open.

The sheath 6 may have threads 8 on the upper end thereof to removably receive the handle 7, and the lid 2. The upper end of the sheath 6, containing the threads 8, extends through an opening in the lid 2 a sufficient distance to receive the handle 7 by such handle being screwed thereon.

The upper end of the sheath 6 is closed by means of a plate 9 which has an opening 30 therein through which the wedge rod 10 extends. The opening 30 is larger in diameter than the rod 10 so that the rod 10 may be displaced laterally by pressing on the handle 11, for purposes which will be hereinafter explained. The wedge rod 10 has threads 12 on the upper end thereof to which the thumb lever 11 is screwed.

A rubber seal 13 is provided about the thumb lever 11 for the purpose of keeping dust and bacteria out of the can 1 when the mechanism hereinafter described is in inoperative position.

A cut-away portion 27 is provided in the handle 7 for the purpose of receiving the gasket or rubber seal 13. A shoulder 28 is provided on the upper edge of the vertical side of the cut-away portion, under which the upper edge of the seal 13 may come to rest and be held down when the wedge rod is brought downward by the action of the coil spring 14.

The coil spring 14 is arranged about the rod 10, and the upper end thereof rests against the top closed end 9 of the sheath 6, and the lower end thereof rests against the top of the wedge 17, so that when the rod 10 is pulled upward by grasping the thumb lever 11, the coil spring 14 is contracted; and when the thumb lever 11 is released, the spring is relaxed and will push the wedge 17 downward, and the point of said wedge will be forced between the tube 4 and the inner wall of the sheath 6, pressing the tube against the center breaker 20.

The wedge 17 should be a solid wedge-shaped member, which may be attached to the lower end of the rod 10 by means of the threads 26.

A bracket 16 is attached to the upper end of the wedge 17 and the flat spring 15 extends upwardly from the outward extension of said bracket. The flat spring 15 is arranged to slidably engage the inner side of the sheath 6, so that when the rod 10 is displaced laterally toward the spring, the spring 15 will be compressed, and when the rod 10 is released the spring 15 will return the rod to normal position.

The wedge 17 extends through the opening 19 in the wedge guide collar 18. The wedge guide collar 18 is rigidly attached to the interior of the sheath 6, and completely closes the sheath 6 except for the rectangular opening 19 therein which slidably receives the wedge 17, so that the wedge 17 may move up and down through the opening 19. Sufficient clearance 19a is provided at the inner side of the opening 19 so that the wedge 17 may be permitted to move up and down and so that it may be laterally displaced by pressing against the thumb lever 11, for the purpose of breaking the suture tube in the manner herein described.

The center breaker 20 is arranged within the sheath 6 in position to approximately coincide with the score mark 25 on the suture tube 4 when the suture tube is inserted into the sheath 6 to the maximum extent, as shown in Fig. I. Center breaker 20 has a concavity 22 therein which constitutes a segment of a circle of lesser circumference than the suture tube pressed thereagainst, so that when the tube 4 is inserted in the sheath 6, it is engaged by breaker 20 only at the two points designated as 23 at the outer extremities of said concavity. When pressure is exerted against the upper end of the tube and it is pressed against the breaker 20 the stress points on the tube will be at the points 23. These stress points are located on the circumference of the tube about 40 degrees apart. From experimentation it has been found that the tube breaks more easily and more evenly, without shattering, by exerting the stress at those points only, instead of around the entire circumference of the tube.

The breaker 20 has a sharp knife-like edge 21 which cuts into the tube at the points 23 when lateral thrust is imparted to the upper end of the suture tube toward the center breaker and thus causes an even break in the tube as shown. The edge 21 of center breaker 20 is arranged to coincide with the score 25 on the suture tube 4, but the suture tube may be evenly broken at any place on its length without the presence of a score mark at the place of breakage. The score merely makes the tube easier to break.

The support 24 is provided on the interior of the sheath 6 near the lower end thereof and is arranged on the opposite side of the sheath from the center breaker 20. This support is provided for the purpose of spacing the suture tube from the interior wall of the sheath and for supporting the lower end of the suture tube, thereby giving better leverage for the breaking of the tube against the breaker 20 when lateral thrust is imparted to the upper end of the suture tube.

The center breaker 20 and the support 24 serve as spacers to space the suture tube from the walls of the sheath, whereby the tube may be bent and broken within the sheath.

This invention may be more easily understood by describing the operation and function thereof. Therefore, such description will be now inserted before the modified forms shown in the drawings are described.

As explained above, the lid of the suture can 1, which is attached at the factory, is removed, when it is desired to remove the suture tubes from the can for breaking or storage. Then when it is desired to pick up a suture tube from the can with my invention, the circulating or nonsterile nurse attending the operation, or other person using it, may grasp the handle 7 and insert the sheath 6 into the can 1 downward over one of the suture tubes in the can.

Before inserting the sheath in the can the nurse pulls upward on the thumb lever 11 and thereby pulls the rod 10 upward, carrying with it the wedge 17, and the spring 14 is compressed. The nurse then inserts the sheath 6 into the can over the tube 4 as far as she can, which will allow the lower end of the sheath 6 to rest on the bottom of the can and the upper end of the suture tube 4 will engage the lower edge of the wedge 17. It will be noted at this point that the lid 3 is resting on the top of the can 1.

Then the nurse releases the upward pressure on the thumb lever 11, the spring 14 relaxes, and exerts downward pressure on the wedge 17, pushing it downward and the wedge 17 thereby exerts lateral pressure against the upper end of the suture tube 4 so that the tube 4 will be firmly held within the sheath 6.

The nurse may then withdraw the device from the can and transport it, with the suture tube therein, to a sterile field. While she is so transporting it, the suture tube is firmly held within the sheath, and the danger of dropping it is reduced to a minimum. The tube is encased within the sheath and is covered by the sterilizing solution from the can, thus eliminating the possibility of contamination.

The nurse, using one hand, may then hold the suture tube breaker over a sterile basin or table and by exerting a slight lateral pressure against the thumb lever 11, toward the center breaker 20, the rod 10 and the wedge 17 are laterally displaced, thus exerting a lateral thrust or leverage against the upper end of the glass suture tube 4, thereby bending it to the breaking point across the breaker 20 at or about the score mark 25. An even break in the suture tube is obtained and there is no shattering of the glass.

The lower end of the suture tube 4, containing the suture 5, will then be permitted to fall out of the sheath 6 and the suture is ready for use by the surgeon. Then by releasing lateral pressure on the thumb lever 11, the spring 15, which has been contracted, will relax and push the rod 10 laterally back to normal position; and by slightly lifting upward on the lever 11, the lateral pressure on the upper part of the suture tube is released and the top portion of the suture tube is permitted to fall out of the sheath. The device is then ready for picking up, transporting and breaking another suture tube.

As shown in preferred form, the lid 2 is detachedly mounted to the sheath 6 so that the lid 2 may be removed from the sheath 6. This is done by unscrewing the handle 7 from the top of the sheath 6, unscrewing the lid 2 and then replacing the handle 7 on the sheath. Thus the suture tube holder, transporter and breaker may be used to pick up, transport and break suture tubes from any container, whether it be a box, glass jar, or a can.

The forms shown in the drawings are designed for use with the type of suture tube can described above. With such can the lid 2 acts as a permanent lid or cover for the can itself and the sheath may be maintained within the can in the sterilizing solution at all times when not in use and the lid thereon will provide a cover for the receptacle, to maintain the sterility of the tubes therein. Of course, the lid 2 may be made of any size so that it will fit any type or size of container.

In the modified form shown in Figures IX and XI a sheath 31 has a flattened upper end 33, shown in cross-section in Fig. XI, and a cylindrical lower end 32 and is attached to the lid 34 by means of welds. However, it may be removably attached to the lid by means of threads. The lid 34 is similar to the lid 2 shown in the preferred form described above, in that it has a flange 35 which extends downwardly over the edge of the conventional can 1. The sheath 31 is of sufficient length to extend to the bottom of the can. The flattened upper end 33 of the sheath 31 is provided to house the lever and cam mechanism to be presently described and is thus flattened to provide additional room for leverage.

A rubber dust gasket 36 is provided over the opening in the lid 34 through which the levers extend, to keep out dust, bacteria and other foreign matter. The opening 37 through the rubber dust gasket provides passage for the levers 38 and 40 to pass therethrough. The passage 37 preferably consists of a narrow slit in which the movable lever 40 may operate so that the gasket will provide a better seal.

The handle 38 is rigidly affixed to the sheath 31 by means of the screw 39. The movable handle 40 is pivoted to the fixed handle 38 by means of the pivot bolt 41, and the inner end 40a of the pivoted lever 40 is rounded to make cam-like engagements with the upper rounded end 42a of the cam lever 42.

The cam lever 42 is pivoted to the sheath 31 by means of the pivot pin 43. A narrow extension 44 on the pivoted cam lever 42 extends downwardly between the inner side of the sheath and the upper end of the suture tube 48, and engages the upper end of a suture tube 48 when the said suture tube is inserted in the sheath in the manner hereinbefore described.

The suture tube 48 has the usual score mark 49 therein which substantially coincides with the center breaker 46 when the suture tube is inserted in the sheath. The center breaker 46 is exactly the same in construction and function as the breaker 20, shown and described in the preferred form. A tube support member 47 is provided in the lower end of the tube and is exactly the same in construction and operation as the support 24 shown and described in the preferred form.

A flat spring 45 is secured on the inside of the sheath 31 with the outwardly extending leg thereof engaging the cam lever 42, and returns the pivoted cam lever 42 to normal position after the operation thereof in the manner which will presently be described.

In the operation of the modified form shown in Figure IX the suture tube holder, transporter and breaker is picked up by means of the fixed handle 38. The sheath 31 is inserted over the tube 48 until the upper end of the tube engages the extension 44 in the position shown in Figure IX. Then slight pressure is exerted against the lever 40 and the pressure is transferred through the cam lever 42 to the upper end of the tube. The suture tube 48 is pressed against the center breaker 46 and is thus prevented from falling out of the sheath when the sheath is picked up and transferred to the place where it is desired that the suture tube be broken.

After the instrument with the suture tube therein, is transferred to the place where the tube is to be broken, a slight additional pressure is exerted against the lever 40, which pressure is transferred through the cam lever 42, to the top of the tube and the top of the tube is thereby laterally displaced toward the breaker 46 and the suture tube is snapped in two at the place of the score 49, obtaining an even break without shattering.

This modified form may, of course, be made and used with or without the lid 34 thereon and operate satisfactorily to hold, transport and break suture tubes.

In the modified form shown in Figure X a single lever is used for the purpose of providing the leverage for picking up and breaking the suture tube. In that form the sheath 56 has a flattened upper end 57 and a cylindrical lower end 58. The flattened upper end 57 is for the purpose of providing additional space for leverage. The sheath 56 is attached to the lid 59 by means of a weld, but could be detachably mounted thereto. An opening 60 is provided through the lid 59, which opening preferably takes the form of a narrow slit through which the lever 72 may be moved. A rubber gasket may be provided over the opening 60 and about the lever 72, as desired.

A looped handle 61 is secured to the lid 59 by means of the bolt and nut 70, and the lid has a flange 71 thereon adapted to extend over the edge of the conventional can 1.

The movable lever 72 is pivoted to the sheath 56 by means of the pivot bolt 73, passing through the sheath.

A center breaker 74 which is exactly the same in construction and function as center breaker 20 in the preferred form described above, is provided on the inside of the sheath to coincide with the score 77 in the suture tube 76, when the suture tube is inserted in the sheath. Likewise a tube support 75 is provided in the lower end of the sheath 56 which is the same in construction and performs the same function as the tube support 24 in the preferred form.

The form shown in Figure X is operated by picking up the lid 59 with the suture tube holder, transporter and breaker attached thereto, and inserting the sheath 56 over a suture tube within the can or elsewhere until the tube reaches the position in the sheath shown in the drawing. In this position the upper end of the tube will engage the lower end of the lever 72. Then, by exerting a slight lateral pressure against the outer end of pivoted lever 72 in the direction away from center breaker 74, a lateral thrust is exerted against the upper end of the suture tube toward the center breaker, and the suture tube is retained within the sheath for transportation to the place where it is desired that the tube be broken. In order to break the suture tube the nurse or operator merely exerts additional pressure against the upper end of the handle 72, and the suture tube is bent and broken across the center breaker 74. The lower half of the suture tube, containing the suture, then falls out. By releasing pressure on the handle 72 the upper half of the suture tube is allowed to fall out and the device is again in position to pick up and break another suture tube.

In the modified form shown in Figure XII the sheath 78 has a flattened upper end 79 and a cylindrical lower end 80, the flattened upper end being provided for the purpose of accommodating the mechanism therein and providing proper leverage. The sheath 78 is secured to the lid 81 by means of a weld, and the lid 81 has a flange 82 to extend over the edge of the conventional can 1, when the lid is placed thereon.

An opening 83 is provided in the top of the lid 81, which opening is preferably a narrow slit sufficient to accommodate the lateral movement of the lever 92.

A looped handle 84 is attached to the lid by means of a shank 85 thereon having a thread 86 extending through the lid, and a nut 87 securing it thereto.

A segment of a disc 88, having a cut-out portion 89 on the lower side thereof, is pivoted to the sheath by means of a pivot bolt 90, which extends through the sides of the sheath.

A lever 92 is attached to the segment 88 by means of the threads 93 on the lower end thereof being screwed into said segment. The lever 92 has a looped handle 91 on the upper end thereof.

The cut-out portion 89 of the segment 88 is adapted to receive the upper end of the suture tube 50, when the suture tube is inserted in the sheath 78. A center breaker 94, of the same construction and function as center breaker 20 in the preferred form, is positioned on the inside of the sheath 78 in position so that it will coincide with the score mark 51 on the suture tube 50, when the suture tube is inserted within the sheath and the upper end of said tube is in position to be engaged in the recess or cut-out portion 89 of the disc 88.

A tube support 95 is provided in the lower end of the sheath 78 which is the same in construction and function as the support 24 in the preferred form.

The device is picked up by inserting the thumb and a finger through the loops 84 and 91 and the sheath 78 is inserted over the suture tube 50 until the tube reaches the position shown in the drawing. Then by laterally pulling the lever 92 toward the handle 84 a lateral thrust is exerted on the upper end of the tube 50 toward the breaker 94 and the tube is held within the sheath while it is being transported to the place where the tube is to be broken. By exerting additional pressure on the lever 92 toward the handle 84, the suture tube 50 is broken across the center breaker 94. The lower end thereof, containing the suture, falls out, and by releasing pressure on the lever 92 the upper end of the tube may be allowed to fall out of the sheath.

Another modified form is shown in Figure XIII in which the sheath 96 has a flattened upper end to accommodate the mechanism therein and has a cylindrical lower end 98 to receive the suture tube. The sheath 96 is attached to the lid 99 by means of a weld or otherwise and the lid has a flange 100 thereon which extends over the side of the conventional can 1.

The fixed handle 101 has a threaded extension 102 thereon which extends through the top of the lid 99 and is secured thereto by means of the nut 103 screwed upon the threaded portion 102.

The pivoted handle 104 is pivotally attached to the fixed handle 101 by means of a pivot bolt 105.

The link 106 is pivotally attached to the pivoted handle 104 by means of a pivot bolt 107. The link 106 extends through the opening 108 in the top of the lid 99, and is pivotally attached to the link 109 by means of the pivot bolt 110. The link 109 has threads 111 on the end thereof which are threaded into the segment of the disc 112.

The segment 112 has a cut-out portion 113 therein and is exactly the same in construction as the segment 88 shown in Figures XII and XIV. The segment 112 is pivotally attached to the sheath 96 by means of the pivot shaft 114 passing therethrough and through the sides of the said sheath.

The segments of a disc designated as 88 and 112 in Figures XII, XIII and XIV, may also take the form of a ball attached to the levers 92 or 109 and pivoted to the sheath and having a recess on the lower side thereof to receive the upper end of the suture tube. In this instance, the recess in the ball would correspond to the cut-out portions 89 and 113.

A center breaker 115 is provided on the inside of the sheath 96, which center breaker is the same in construction and function as center breaker 20 in the preferred form. This center breaker is arranged to correspond with the score mark 118 on the suture tube 117 when the suture tube is inserted in the sheath in the position shown in Figure XIII.

The lower support 116 is provided in the sheath 96 and is the same in construction and function as the lower support 24 in the preferred form.

To operate the modified device shown in Figure XIII the device, with the lid attached thereto, is picked up by the handle 101. The sheath 96 is inserted over the suture tube 117 within the can 1, and the handle 104 is adjusted upward or downward until the cut-out portion 113 coincides with the upper end of the suture tube and the said upper end is allowed to enter said cut-out portion. Then the handle 104 is pulled upward and the disc 112 is rotated counterclockwise, thus exerting a lateral thrust on the upper end of the suture tube in the direction of the center breaker 115. Sufficient pressure is exerted upward against the handle 104 to hold the suture tube 117 within the sheath while it is being transported to the place of breaking. Then additional upward pressure may be exerted against the handle 114, thus further rotating the disc 112 counterclockwise and bending the tube 117 across the center breaker 115, thus breaking it at the point of the score 118. The lower end of the tube with the suture therein will be allowed to fall out and by releasing the pressure on the handle 104 the upper end of the tube will be allowed to fall out of the sheath.

Another modified form is shown in Figure XV in which the sheath 119 has an enlarged upper end 120 and a smaller lower end 121. A shoulder 122 is provided between the upper and lower ends of sheath 119. A solid cylindrical bushing, or rod 123 is rotatively carried in the upper end 120 of the sheath 119 and rests upon the shoulder 122. The bushing 123 has a recess 124 eccentrically located on the lower end face thereof, which recess is adapted to receive the upper end of the suture tube 131 when the suture tube is inserted in the sheath 119 as shown in Figure XV.

A handle 125 is secured to the upper end of the bushing 123 by means of the shank 126 which is secured to the handle and the bushing.

The sheath 119 is secured to the lid 127 by a weld or otherwise, which lid has flange 128 extending over the upper edge of the conventional can 1.

A center breaker 129 of the same form as center breaker 20 in the preferred form is positioned on the inside of the sheath 119. The support 130 is positioned on the inside of the sheath at the lower end thereof and said support is the same in construction and function as the support 24 shown and described in the preferred form. The suture tube 131 is so positioned in the sheath that the score 132 thereon will coincide with the center breaker 129, when the suture tube is in position for breaking within the sheath as shown in Fig. XV.

The operation of the modified form shown in Figure XV is accomplished by placing the sheath 119 over the suture tube 131 and allowing the tube to enter the sheath until the upper end thereof enters the recess 124. Then the handle 125 may be rotated in either direction, thereby exerting a lateral thrust or leverage against the upper end of the tube 131, and pressing the suture tube against the center breaker 129, so that the tube 131 is retained within the sheath for transportation to the place of breaking. The tube may be broken by merely exerting greater rotative pressure on the handle 125 and thus exerting additional lateral thrust against the upper end of the suture tube 131, thereby bending and breaking it across the center breaker 129. The lower end of the suture tube will fall out of the sheath and the upper end thereof may be allowed to fall out by releasing the pressure on the handle 125.

An additional modified form of my invention is shown in Figure XVI in which the sheath 133 is attached to the lid 134 by means of welds or otherwise. The lid 134 has flanges 135 thereon to fit over the top of the conventional can 1. An opening 136 is provided through the top of the lid to receive the upper end of the sheath 133 through which the handles 137 and 139 extend. This opening may be covered with a plate or gasket (not shown) with a slit therein in which the movable handle 139 may operate.

The handle 137 is fixed to the sheath 133 by means of the weld 138, and the pivoted, movable handle 139 is pivoted to the fixed handle 137 by means of the pivot bolt 140. The lower end of the handle 139, as designated by the numeral 141, is rounded and is adapted to engage the flat, outer end extension 142a of the cam lever breaker 142.

The cam lever breaker 142 is pivoted to the sheath 133 by means of the pivot bolt 143 passing through the lever and the sheath.

A flat spring 144 has one leg thereof secured to the inside of the sheath 133 and the spring leg thereof engages the upper surface of the extension 142a on the cam lever breaker 142. The cam lever breaker works against the said spring and the spring pushes it back to normal position after the cam lever 142 has been actuated in the manner which will be hereinafter described.

The cam lever breaker 142 has a center breaker 145 welded or otherwise rigidly attached thereon. The center breaker 145 is exactly the same in construction and operation as center breaker 20 in the preferred form, and is adapted to coincide with the score 149 in the suture tube 148 when the suture tube is in position in the sheath as shown in Figure XVI.

There is an upper tube support 146 positioned on the interior of the sheath 133 which is the same in construction as the tube support 24 as shown in the preferred form. There is also a lower tube support 147 which is the same in construction as the tube support 24 in the preferred form. It will be noted that both tube supporters 146 and 147 are on the same side of the sheath, so that they space the suture tube from the wall of the sheath.

The modified form shown in Figure XVI is operated by placing the sheath over the tube 148 and allowing the tube to enter the sheath to the position shown in Figure XVI. This is accomplished by grasping the handle 137, and pulling up on handle 139 to allow the suture tube to go past the lower end of the cam lever 142. When the tube is in position in the sheath, pressure is exerted downwardly on the pivoted handle 139 which actuates the cam lever 142 by reason of the lower end 141 of the lever 139, pressing against the extension 142a. This causes the center breaker 145 to press against the tube 148 and it may thus be held in place in the sheath 133 for transportation to the place where the tube is to be broken. When it is desired to break the suture tube additional pressure is exerted downward against the pivoted handle 139, which pressure is transferred through the cam lever 142, and the center breaker 145 is pressed inward against the tube 148 at or about the score 149, thus breaking the tube 148 at the point of the score where the center breaker 145 is pressed against it. The lower end of the tube, containing the suture, will fall out of the sheath and when pressure is released from the pivoted handle 139 the upper end of said tube will fall out of the sheath.

In the modified form shown in Figures XVIII, XIX, XX and XXI, the sheath 150 is attached to the lid 161 by means of a weld or otherwise. The bushing 151 is rotatably and slideably mounted in the upper end of the sheath 150, and has a handle 152 affixed thereto by means of the threaded extension 153 screwed therein. A bore 154 is provided in the lower end of the bushing 151. This bore 154 is angularly disposed in relation to the vertical axis of the bushing 151, and is of sufficient diameter to receive a suture tube.

The bushing 155 is rigidly affixed in the lower end of the sheath 150, and has a bore 156 passing therethrough of the same diameter as bore 154. The bore 156 is angularly disposed relative to the vertical axis of the fixed bushing 155.

The bores 156 and 154 are adapted to coincide and have a common vertical axis at one point in the rotation of the bushing 151. As shown in Figure XVIII the two bores are made to coincide and the suture tube 158 is allowed to enter the bore 154. The bushings 151 and 155 are so arranged that they meet at the point 157 at the place where the score 159 in the suture tube 158 is located, when the suture tube is in position in the sheath 150 as shown in Fig. XVIII. The point 157 corresponds with the function of the center breaker shown in the other forms of my invention. Also the vertical axes of the bushings 151 and 155 cross the vertical axis of the suture tube 158 at the mid point of the score 159.

In operation the suture tube breaker is placed over the tube 158 by allowing the tube to enter the bore 156. The bushing 151 is rotated by means of handle 152 until the bores 156 and 154 coincide and allow the tube 158 to enter the upper bore. Then by exerting a slight rotative pressure against the handle 152 the breaker, with the tube therein, may be removed from the can and transported to the place of breaking. In order to break the tube, additional rotative pressure is exerted against the handle 152 and the tube 158 is broken in two at the point 157 where the two bushings meet by reason of the leverage applied to the ends of the tube. The lower end of the tube, containing the suture 160, will then fall out and by rotating the bushing 155, so that the bores 154 and 156 will again coincide, the upper end of the suture tube will be allowed to fall out through the bore 156.

The modified form shown in Figures XVIII, XIX, XX and XXI will also operate by making the bores 154 and 156 truly vertical with relation to the bushings 151 and 155. In such instance, one of the bores would have to be eccentrically disposed in its bushing so that the bores would coincide only at one position of rotation of the rotative bushing. By employing such arrangement, the suture tube would be sheared in two at the point where the bushing bores meet by the rotation of the rotatable bushing.

The form shown in the drawings is preferred, because by angularly disposing the bores the stress points on the suture tube, occasioned by rotation of bushing 151, are moved to the outer ends of the tube and the tube is broken by a leverage action applied to the outer ends of the tube to break it rather than being sheared and crushed at the point 157. There is less shattering of glass by breaking the suture tube with the form shown.

It is pointed out and emphasized that there is a similarity of function and principle between all of the forms shown in the drawings. That similarity consists of the breaking of a suture tube within a sheath by means of leverage applied thereto, whether that leverage is applied by means of a lever and fulcrum arrangement, by means of a lever and cam, or by means of eccentric bores or recesses in a rotatable bushing.

All of these forms also embody the method and principle of picking up, transporting and breaking a suture tube while it is enclosed within a sheath, whereby it is not exposed to outside atmosphere and danger of contamination.

They all present a surgical instrument for picking up, transporting and breaking a suture tube which instrument may be kept in the sterilizing solution in which the suture tubes are packed and maintained and is, therefore, at all times sterile and ready for use.

All forms shown also present a method and device for so picking up, transporting and breaking suture tubes in which the suture tube is protected and covered by a film of the sterilizing solution from the suture tube container while it is being transported to the location for breaking.

It is to be understood that other and further forms of this invention may be devised and made without departing from the spirit and scope of the attached claims.

I claim:

1. A method of breaking suture tubes comprising, inserting a sheath over a suture tube within a receptacle for suture tubes, removing the suture tube within the sheath from said receptacle, and bending said tube within the sheath until the said tube breaks within the sheath.

2. The method of maintaining sterile conditions in the removal of sutures from breakable capsules, comprising the enveloping of said capsules in a sheath while they are immersed in sterile liquid, lifting them from such liquid while in said sheath, breaking them while in said sheath, and dropping said sutures from said sheath upon a sterile surface.

3. The method of maintaining sterility of suture tubes during the process of breaking them, comprising the immersion of a suture tube in a sterile bath, the enveloping of said tube by a sterile sheath, the removal of the tube from the bath in the sheath, the maintenance of a sterile film about said tube during such removal, and the breaking of such tube within such sheath.

4. The method of maintaining sterility of suture tubes during the process of breaking them, comprising the immersion of a suture tube in a sterile bath, the enveloping of said tube by a sterile sheath while in said bath, the removal of the tube from the bath in the sheath, and the breaking of such tube within such sheath.

5. In a device of the class described, a sheath adapted to receive a suture tube therein; a lid attached to the upper end of said sheath and adapted to fit over the top of a suture tube container; and means disposed in operative relation to said sheath and arranged to bend a suture tube within the sheath when placed therein to thereby break it within the sheath.

6. In a device of the class described, a rigid sheath adapted to receive a suture tube therein said sheath having an open end whereby it may be inserted over a suture tube within a container for suture tubes; and lever means disposed in operative relation to said sheath and arranged to bend a suture tube within the said sheath when placed therein until it breaks.

7. In a device of the class described, a sheath adapted to receive a suture tube therein; a center breaker disposed within the sheath and adapted to approximately correspond with the score mark on a suture tube disposed within the sheath; a support disposed within the sheath near the lower end of said sheath adapted to space the suture tube from the interior wall of said sheath; a wedge disposed within the sheath, the pointed end of which wedge is adapted to enter the space between a suture tube disposed in the sheath and the interior wall of the sheath; and means carried by the outer end of the wedge whereby the wedge may be moved up and down and lateral thrust may be applied thereto.

8. In a device of the class described, a sheath adapted to receive a suture tube therein; a center breaker disposed within the sheath and adapted to engage a suture tube and to space it from the wall of the sheath; a support disposed within the sheath near the lower end of said sheath to support and space the suture tube from the interior wall of the sheath; a wedge disposed within the sheath, the pointed end of which wedge is adapted to enter the space between a suture tube disposed in the sheath and the interior wall of the sheath; and means carried by the outer end of the wedge whereby the wedge may be moved up and down and lateral thrust may be applied thereto.

9. In a device of the class described, a sheath adapted to receive a suture tube therein; a center breaker disposed within the sheath and adapted to approximately correspond with the score mark on a suture tube disposed in the sheath; a support disposed within the sheath near the lower end of said sheath adapted to space the suture tube from the interior wall of said sheath; a wedge disposed within the sheath, the pointed end of which wedge is adapted to enter the space between a suture tube disposed in the sheath and the interior wall of the sheath; means carried by the outer end of the wedge whereby the wedge may be moved up and down and lateral thrust may be applied thereto; and spring means attached between the wedge and the sheath adapted to urge the said wedge downward.

10. In a device of the class described, a sheath adapted to receive a suture tube therein; a center breaker disposed within the sheath and adapted to approximately correspond with a score mark on a suture tube; a support disposed within the sheath near the lower end of said sheath adapted to space the suture tube from the interior wall of said sheath; a wedge disposed within the sheath, the pointed end of which wedge is adapted to enter the space between a suture tube disposed within the sheath and the interior wall of the sheath; means carried by the outer end of the wedge whereby the wedge may be moved up and down and lateral thrust may be applied thereto; and spring means disposed between the wedge and one wall of the sheath to urge the wedge against the opposite wall of said sheath.

11. In a device of the class described, a sheath adapted to receive a suture tube therein; a center breaker disposed within the sheath and adapted to approximately correspond with the score mark on a suture tube; a support disposed within the sheath near the lower end of said sheath adapted to space the suture tube from the interior wall of said sheath; a wedge disposed within the sheath, the pointed end of which wedge is adapted to enter the space between a suture tube disposed in the sheath and the interior wall of the sheath; means carried by the outer end of the wedge whereby the wedge may be moved up and down and lateral thrust may be applied thereto; and a lid attached to the upper end of said sheath and adapted to fit over and close a receptacle containing suture tubes.

12. In a device of the class described, a sheath adapted to extend to the bottom of a container for suture tubes, and arranged to receive a suture tube therein said sheath having an open end whereby the sheath may be inserted over a suture tube within a container for suture tubes; means to space the said suture tube from the interior wall of said sheath intermediate the ends of said suture tube; a handle affixed to said sheath; a handle pivoted to said fixed handle; a pivoted cam lever pivoted to said sheath the upper end of which is adapted to engage the lower end of said pivoted handle and to be laterally displaced thereby, said pivoted cam lever having an extension on the lower end thereof adapted to extend between the upper end of a suture tube placed in said sheath and the wall of said sheath, whereby by the operation of the pivoted handle lateral thrust will be imparted to the top of said suture tube and thereby break it across a spacer element within said sheath.

13. In a device of the class described, a sheath adapted to extend to the bottom of a container for suture tubes and arranged to receive a suture tube therein; a lid attached to the upper end of such sheath and adapted to fit over the top of a suture tube container; a fixed handle carried by said lid; a lever pivoted to said sheath, said lever having the upper end thereof extending through the upper end of said sheath, and having the lower end thereof adapted to enter the space between the upper end of a suture tube and the wall of said sheath when a suture tube is placed in the sheath; and means to space a suture tube from the interior wall of said sheath intermediate the ends of said suture tube.

14. In a device of the class described, a sheath adapted to extend to the bottom of a container for suture tubes and arranged to receive a suture tube therein said sheath having an open end whereby it may be inserted over a suture tube in a container for suture tubes, a segment of a disc arranged inside of said sheath and pivoted thereto; a lever attached to said segment, the outer end of which extends beyond the top of said sheath; a recess arranged in said segment adapted to receive the upper end of a suture tube when the said tube is inserted within the sheath; and means to space the said suture tube from the walls of said sheath intermediate the ends of said suture tube.

15. In a device of the class described, a sheath adapted to extend to the bottom of a container for suture tubes and arranged to receive a suture tube therein, a lid attached to the upper end of said sheath and adapted to fit over the top of a suture tube container; a handle carried by said lid; a segment of a disc arranged inside of said sheath and pivoted thereto; a lever attached to said segment, the outer end of which extends beyond the top of said sheath; a recess arranged in said segment adapted to receive the upper end of a suture tube when the said tube is inserted within the sheath; and means to space the said suture tube from the walls of said sheath intermediate the ends of said suture tube.

16. In a device of the class described, a sheath adapted to extend to the bottom of a container for suture tubes and arranged to receive a suture tube therein, a segment of a disc arranged inside of said sheath and pivoted thereto; a lid attached to the upper end of said sheath and adapted to fit over the top of a suture tube container; a fixed handle carried by said lid; a lever pivoted to said fixed handle and operably attached to said segment; a recess in said segment arranged to receive the upper end of a suture tube when the said tube is inserted within the sheath; and means within the said sheath to space the said suture tube from the interior walls thereof intermediate the ends of said suture tube.

17. In a device of the class described, a sheath adapted to extend to the bottom of a container for suture tubes and arranged to receive a suture tube therein, a lid attached to the top of the said sheath and adapted to fit over the top of a suture tube container; a fixed handle carried by said lid; a segment of a disc arranged inside of said sheath and pivoted thereto; a lever pivoted to said fixed handle and operatedly attached to said segment; a recess in said segment arranged to receive the upper end of a suture tube when the said tube is inserted within the sheath; and means within the said sheath to space the said suture tube from the interior walls thereof intermediate the ends of said suture tube.

18. In a device of the class described, a sheath adapted to extend to the bottom of a container for suture tubes and arranged to receive a suture tube said sheath having an open end whereby it may be inserted over a suture tube in a container for suture tubes; a handle affixed to the said sheath; a handle pivoted to the fixed handle; a cam lever pivoted to the said sheath, the upper end of which is adapted to engage the lower end of the said pivoted handle; a center breaker attached to the lower end of said cam lever and arranged to engage the said suture tube and to be pressed thereagainst when the pivoted handle is actuated; and means to space the said suture tube from the walls of said sheath near the upper and lower ends thereof.

19. In a device of the class described, a sheath adapted to extend to the bottom of a container for suture tubes and arranged to receive a suture tube, a lid attached to the upper end of said sheath and arranged to fit over the top of a container for suture tubes; a handle affixed to the said sheath; a handle pivoted to the fixed handle; a cam lever pivoted to the said sheath, the upper end of which is adapted to engage the lower end of the said pivoted handle; a center breaker attached to the lower end of said cam lever and arranged to engage the said suture tube and to be pressed thereagainst when the pivoted handle is actuated; and means to space the said suture tube from the walls of said sheath near the upper and lower ends thereof.

20. In a device of the class described, a sheath adapted to receive a suture tube therein said sheath having an open end whereby it may be inserted over a suture tube within a container for suture tubes; a spacer element disposed within the sheath and adapted to contact a suture tube intermediate its ends when placed in the sheath; and lever means arranged to apply lateral thrust to an end of the suture tube to break it against the spacer element.

21. In a device of the class described, a sheath adapted to receive a suture tube therein; a spacer element disposed within the sheath and adapted to contact a suture tube intermediate its ends when placed in the sheath; a wedge disposed within the sheath, the pointed end of which wedge is adapted to enter the space between a suture tube placed in the sheath and the interior wall of the sheath; and an extension carried by the wedge extending out of the sheath whereby pressure may be applied externally of the sheath to the wedge to break the suture tube against the spacer element.

22. In a device of the class described, a sheath adapted to extend to the bottom of a container for suture tubes and arranged to receive a suture tube therein; a lever mounted for pivotal movement relative to the sheath, said lever having the upper end thereof extending through the upper end of said sheath, and having the lower end thereof adapted to enter the space between the upper end of a suture tube positioned in said sheath and the wall of said sheath; and means to space the suture tube from the interior wall of said sheath intermediate the ends of the suture tube.

References Cited in the file of this patent

UNITED STATES PATENTS

| Number | Name | Date |
|---|---|---|
| 1,259,964 | Davis | Mar. 19, 1918 |
| 2,105,487 | Lozon | Jan. 18, 1938 |
| 2,232,978 | Smith | Feb. 25, 1941 |
| 2,378,283 | Bucher | June 12, 1945 |
| 2,425,093 | Fosler | Aug. 5, 1947 |
| 2,447,988 | Pierson | Aug. 24, 1948 |
| 2,482,833 | Biro | Sept. 27, 1949 |
| 2,488,956 | Yeskett | Nov. 22, 1949 |

(Other references on following page)

FOREIGN PATENTS

| | | | |
|---|---|---|---|
| 22,812 | Great Britain | Oct. 22, | 1904 |
| 379,700 | Germany | Aug. 30, | 1923 |
| 420,994 | Germany | Aug. 16, | 1925 |
| 467,933 | Great Britain | June 25, | 1937 |
| 535,391 | Germany | Oct. 9, | 1931 |
| 593,263 | France | Apr. 20, | 1925 |
| 867,223 | France | Oct. 7, | 1941 |
| 895,035 | France | Mar. 27, | 1944 |

OTHER REFERENCES

General Catalogue Hospital and Surgical Supplies, Kny-Scheerer Corp., 1930, page A-38, item B-7025, Pool's Catgut Tube Breaker. A copy of this publication is available in Div. 55 of the Patent Office.

"Textbook on Sutures," by Paul F. Ziergler, December 1944, page 30, page 31, 1 sheet of photographs facing page 30. A copy of this publication is available at the Army Medical Library, 7th and Independence Avenue S. W., Washington, D. C., also in Division 55 of the Patent Office.